United States Patent Office 2,744,077
Patented May 1, 1956

2,744,077

RUBBER HYDROCHLORIDE FILM CONTAINING A DIALKYL ETHER

Max H. Thornton, Kansas City, Mo., assignor, by mesne assignments, to The Goodyear Tire & Rubber Company, a corporation of Ohio No Drawing. Application February 20, 1953, Serial No. 338,140

3 Claims. (Cl. 260—3.5)

This invention relates to a rubber hydrochloride film having improved resistance to the passage of water vapor due to the presence of a dialkyl ether in the film.

Rubber hydrochloride film is relatively moisture resistant compared to a number of other commercial plastic films. Most commercial rubber hydrochloride film contains a substantial percentage of plasticizer to make the film more flexible and stronger, etc. and the presence of such material makes the film more permeable to water vapor.

It has now been found that the addition of a small amount of a dialkyl ether increases the resistance of rubber hydrochloride film to the passage of water vapor provided the ether is a solid at the temperature at which the film is used, and films, even plasticized films, are obtained which are very resistant to the passage of water vapor. The lower dialkyl ethers are liquid at room temperature so that in films designed for packaging products for storage at room temperatures the longer chain ethers must be used. These ethers have at least twelve carbon atoms in each alkyl group. They may have as many as 16, 18, 20, 22 or even 24 or more carbon atoms in each alkyl group. They may be simple ethers or mixed ethers. The alkyl groups may be straight or branched chain. Non-permanent ethers, such as diethyl ether, will not ordinarily be used under any circumstances.

It will not ordinarily be commercially feasible to produce a film to be used only at low temperatures, e. g. for the packaging of frozen foods. Ethers containing less than 12 carbon atoms in each alkyl group could be used in such films. Practically, ethers containing at least 12 carbon atoms will be used because the resulting film will be suitable for use on frozen foods and for other low temperature packaging as well as at room temperature, and also above room temperature if the alkyl groups contain a sufficient number of carbon atoms.

The dialkyl ethers are so insoluble in pure rubber hydrochloride that it is difficult to incorporate sufficient ether in unplasticized rubber hydrochloride film to have a substantial effect on the rate of water-vapor transfer through film of such material. For most commercial packaging operations plasticization of rubber hydrochloride film is required to improve the physical properties of the film. Due to the relative insolubility of the dialkyl ethers in a plasticized film it is desirable to use an ether compatibilizer in the rubber hydrochloride with the plasticizer. The ether compatibilizer may be used in the rubber hydrochloride without plasticizer, although generally both the plasticizer and compatibilizer will be added to the rubber hydrochloride. The amount of plasticizer and compatibilizer that are employed will vary depending upon the change desired in the physical properties of the film. The compatibilizer and plasticizer may be used in equal amounts, or any ratio may be used. The two materials may be used in amounts of 5, 10, 20 or 30 per cent or more, based on the weight of the rubber hydrochloride. Any of the following plasticizers which are improvers of the physical properties of the rubber hydrochloride may be used with any of the other plasticizers listed as ether compatibilizers:

*Improvers of physical properties of rubber hydrochloride*

2-ethylhexyl-diphenyl phosphate, known commercially as Santicizer 141, tricresyl phosphate, triethyl phosphate, tributyl phosphate, triphenyl phosphate, the alkoxyalkyl phosphates, e. g. the tributoxyethyl phosphate known as KP 140, trimethoxymethyl phosphate, trimethoxyethyl phosphate, tributoxypropyl phosphate, etc., dibutyl phthalate, a hydrogenated abietate, such as the dihydromethyl abietate known as Hercolyn D, dialkyl esters of a higher molecular weight aliphatic dicarboxylic acid, such as dialkyl adipates and dialkyl sebacates, for example, diisobutyl adipate, diisooctyl adipate, octyldecyl adipate, dioctadecyl adipate, di(2-ethylhexyl) adipate manufactured by Ohio Apex Company and known commercially as Adipol 2EH, dibutyl sebacate, dipropyl sebacate, etc.

*Ether compatibilizers*

Hydrogenated terphenyls, e. g. the liquid hydrogenated terphenyl known as HB40, and the solid hydrogenated terphenyl known as Santowax O, chlorinated paraffin containing at least 50 parts of chlorine or thereabout, e. g. Chlorowax 70, the alkoxyalkyl phosphates, e. g. any of the foregoing including the tributoxyethyl phosphate known as KP140, dibutyl phthalate, cumarone, indene and cumarone-indene resins of different softening points such as that known as Cumar P25, and a hydrogenated abietate such as Hercolyn D.

One experiment was run to show the effect of dicetyl ether on the water-vapor transmission rate (W. V. T. R.) of rubber hydrochloride film containing different compatibilizers and different plasticizers. The water-vapor transmission test used on these films and other films mentioned herein is a standard test conducted with a relative humidity differential of 90 to 95 per cent between the two sides of the film, the W. V. T. R. in each case being the number of grams of water vapor transmitted per one hundred square inches of the film in 24 hours. The tests were run either at 86° F. or 104° F., as indicated. All of the films tested were 0.0012 inch thick. The results of this first test run at 86° F. are recorded below. Compatibilizer and a material which improves the properties of the film were used in equal amounts and the amount recited refers to the sum of the two per 100 parts of rubber hydrochloride. The per cent of light transmitted through the film was determined to indicate whether the ether was entirely dissolved in the film or whether some was not dissolved and interfered with the transparency of the film. The results show that up to about 1.5 percent of the ether was dissolved in films of the various compositions tested, but that when 2 per cent of the ether was used a considerable portion remained undissolved.

| Plasticizer | Parts Dicetyl Ether | WVTR | Percent Light Transmission |
|---|---|---|---|
| 20 parts Adipol 2EH | 2.0 | .11 | 38 |
| Do | 0.3 | 2.07 | 88 |
| Do | 0.7 | .54 | 86 |
| Do | 1.5 | .05 | 83 |
| 29 parts Santicizer 141 and HB40 | 1.5 | .04 | 83 |
| Do | 1.0 | .09 | 81 |
| Do | 1.25 | .06 | 85 |
| 32 parts Adipol 2EH and Hercolyn D | 1.0 | .54 | 87 |
| Do | 1.25 | .47 | 86 |
| 30 parts Dibutyl phthalate and HB40 | 1.0 | .15 | 87 |
| Do | 1.25 | .05 | 85 |

The data of Table I shows that the W. V. T. R. of films containing 0.7 to 2.0 parts of dicetyl ether are in the range of 0.04 to 0.54. The W. V. T. R. of unplasticized rubber hydrochloride film 0.0012 inch thick is 0.20 while that of film with 15 to 30 parts of plasticizer will be from 1.2 to 5 or higher. Thus the use of dicetyl ether in these highly plasticized films has reduced the W. V. T. R. to values equal to or less than that of unplasticized film.

A test was made to show the effect of dialkyl ethers in unplasticized film.

| | | |
|---|---|---|
| Rubber Hydrochloride parts | 100 | 100 |
| Dioctadecyl Ether do | 0 | 1 |
| W. V. T. R. | 0.69 | 0.46 |

The ether appreciably decreases the W. V. T. R. Although the ether is not all dissolved and consequently the film is not perfectly transparent, the film is satisfactory for lamination to foil, etc. However, ordinarily only transparent films are desired because the ether is expensive and all undissolved ether is wasted.

Another experiment was run on rubber hydrochloride film of the same thickness, all films being plasticized with 14.5 parts each of Santicizer 141 and HB40. Different ethers were used, the mounts of ether employed being recorded in Table II. The W. V. T. R. in each case was run at 86° F. The results were as follows:

| Dialkyl Ether | Parts Ether | WVTR | Percent Light Transmission |
|---|---|---|---|
| Dioctyl ether | 1.5 | 3.3 | 86 |
| Do | 1.0 | 2.5 | 88 |
| Didecyl ether | 1.5 | 3.7 | 86 |
| Do | 1.0 | 3.0 | 88 |
| Ditetradecyl ether | 1.5 | 0.29 | 86 |
| Do | 1.0 | 0.52 | 88 |
| Dicetyl ether | 1.5 | 0.04 | 83 |
| Do | 1.25 | 0.08 | 84 |
| Do | 1.0 | 0.16 | 81 |
| Do | 0.8 | 0.14 | 90 |
| Do | 0.125 | 1.70 | 88 |
| Dioctadecyl ether | 2.0 | 0.03 | 82 |
| Do | 1.5 | 0.04 | 84 |
| Do | 1.0 | 0.04 | 87 |

It will be seen that at the temperatures employed for the test the effect of the liquid ethers, i. e. the dioctyl and didecyl ethers is not comparable to the effect of the solid ethers. The solid ethers give a very low W. V. T. R. In general it may be said that the light transmission is reduced somewhat by using more than one part of ether per 100 parts of rubber hydrochloride. Although the W. V. T. R. is somewhat lower with the larger amounts of the different ethers, any excess over 1 or 1.5 parts per 100 parts of rubber hydrochloride is apt to bloom to the surface of the film on standing.

Another experiment shows that when either of the two types of plasticizers described herein (viz. ether compartibilizers and plasticizers of the type which improve the properties of a rubber hydrochloride film) is used alone with 1.5 parts of dicetyl ether, the water-vapor transfer rate of the film may be relatively high. The W. V. T. R. of the films were determined at 86° F.

| Plasticizer | Percent Plasticizer | WVTR | Percent Light Transmission |
|---|---|---|---|
| Hercolyn D | 35 | 0.22 | 88 |
| Dibutyl phthalate | 20 | 0.04 | 86 |
| HB40 | 40 | 0.71 | 87 |
| Santicizer 141 | 25 | 0.06 | 85 |
| Dibutyl sebacate | 18 | 0.19 | 85 |
| Chlorowax 70 | 30 | 0.24 | 86 |
| Santowax O | 30 | 0.05 | 87 |

A further series of films was tested at 86° F. to determine the effect of different amounts of ether on film containing 20 parts of dibutyl phthalate. The results are recorded below.

| Percent dicetyl ether: | WVTR |
|---|---|
| 0.10 | 1.39 |
| 0.25 | 0.32 |
| 0.50 | 0.15 |
| 1.00 | 0.13 |
| 1.50 | 0.14 |

The results of the foregoing tables indicate that it is desirable to use in the range of 1 to 1.5 parts of the ether per 100 parts of rubber hydrochloride.

Another series of films was tested to determine the effect of different amounts of mixed plasticizers, the ratio of the amounts of the two plasticizers in each film being 1:1. Each film contained 0.9 part of dioctadecyl ether (based on the weight of the rubber hydrochloride). The W. V. T. R. of each film was determined at 104° F. and is recorded below.

| Mixed Plasticizers | Parts Plasticizer Per 100 Parts Rubber Hydrochloride | | | | | |
|---|---|---|---|---|---|---|
| | 5 | 10 | 15 | 20 | 25 | 30 |
| Dibutyl phthalate; Hercolyn D | 0.57 | 0.30 | 0.67 | 0.66 | 3.05 | |
| Monoplex S-71; HB40 | 0.66 | 0.67 | 0.95 | 1.16 | 2.08 | 2.49 |
| Hercolyn D; HB40 | 0.45 | 0.31 | 0.35 | 0.57 | 1.12 | 1.41 |
| Santicizer 141; Hercolyn D | 0.41 | 0.44 | 0.48 | 0.72 | 0.82 | 1.01 |
| Santicizer 141; HB40 | 0.37 | 0.33 | 0.37 | 0.60 | 0.73 | 0.83 |
| Dibutyl phthalate; KP140 | 0.48 | 0.57 | 0.55 | 0.49 | 0.60 | 0.86 |
| Dibutyl phthalate; Chlorowax 70 | 0.56 | 0.44 | 0.38 | 0.42 | 0.56 | 0.51 |
| Dibutyl phthalate | 0.38 | 0.34 | 0.43 | 0.52 | 0.72 | 1.53 |

At 104° F. and 93 per cent relative humidity differential the W. V. T. R. of unplasticized rubber hydrochloride film 0.0012 inch thick is 0.50 while that of film with 15 to 30 parts of plasticizer will be from 2.9 to 10 or higher. It is apparent that the diotadecyl ether has reduced the W. V. T. R. of most of the film compositions to values equal to or less than that of unplasticized film.

Certain of the foregoing films were subjected to a drop-height test to determine their comparative strengths. A standard test was used in which a weight is dropped on film from increasingly greater heights and the final height at which the film bursts is recorded. Generally speaking, films of higher plasticizer content give better drop-height values, so highly plasticized films of low W. V. T. R. were selected for this test. The W. V. T. R. of the films was determined at 104° F. Each film tested contained 0.9 part of dioctadecyl ether.

| Mixed Plasticizer | Parts Plasticizer | Film Thickness | Drop-Height, Inches | WVTR |
|---|---|---|---|---|
| Dibutyl phthalate; Chlorowax 70 | 30 | .0012 | 19 | 0.46 |
| Dibutyl phthalate; KP140 | 20 | .0012 | 10 | 0.47 |
| Dibutyl phthalate; Hercolyn D | 20 | .0012 | 20 | 0.63 |
| Monoplex S71; HB40 | 10 | .0013 | 7 | 0.70 |
| Santicizer 141; HB40 | 20 | .0014 | 22 | 0.80 |
| Santicizer 141; Hercolyn D | 15 | .0013 | 10 | 0.58 |
| Hercolyn D; HB40 | 20 | .0015 | 13 | 0.64 |
| Dibutyl phthalate | 20 | .0013 | 22 | 1.05 |

The drop height values in the preceding table were determined at 40° F. At this temperature the drop height of unplasticized rubber hydrochloride film is 2.0 inches. While the drop height required for different packaging applications will vary, in most cases it is desirable to have a minimum drop height of 20 inches at 40° F.

What I claim is:

1. Rubber hydrochloride film which contains a dialkyl ether in which each alkyl group has at least eight carbon atoms which improves its resistance to the passage of water vapor.

2. Cast rubber hydrochloride film which contains dialkyl ether which is solid at room temperature and which improves the film's resistance to the passage of water vapor at room temperature.

3. The film of claim 2 which is plasticized with (1) a compatibilizer for the ether which increases its solubility in the film and is selected from the group consisting of hydrogenated terphenyls, chlorinated paraffin, the alkoxyalkyl phosphates, dibutyl phthalate, hydrogenated abietate, and coumarone, indene, and coumarone-indene resins, and (2) an improver of a physical property of the film selected from the class consisting of dibutyl phthalate, esters of hydrogenated abietic acid, alkylarylphosphates, and dialkyl esters of aliphatic dicarboxylic acids containing at least 6 carbon atoms in the aliphatic chain; the compatibilizer and the improver of the physical properties being different compounds and the ratio of said compatibilizer to said improver of the physical properties being from 2:1 to 1:2.

No references cited.